(12) United States Patent
Chen

(10) Patent No.: US 6,383,440 B1
(45) Date of Patent: May 7, 2002

(54) CONTAINER MANUFACTURING METHOD

(76) Inventor: Shou-Te Chen, No. 1, Alley 11-1, Lane 123, Chang-I 6 Street, Tai-Ping Hsiang, Taichung Hsien (TW)

( * ) Notice: Subject to any disclaimer, the term of this patent is extended or adjusted under 35 U.S.C. 154(b) by 0 days.

(21) Appl. No.: 09/352,879

(22) Filed: Jul. 13, 1999

Related U.S. Application Data

(63) Continuation-in-part of application No. 08/992,271, filed on Dec. 17, 1997, now abandoned.

(51) Int. Cl.$^7$ ................................................ B29C 49/10
(52) U.S. Cl. .................. 264/529; 264/531; 264/534; 264/540; 264/162
(58) Field of Search ................. 264/529, 531, 264/534, 540, 162; 65/75, 77, 79, 82

(56) References Cited

U.S. PATENT DOCUMENTS 4,283,215 A * 8/1981 Sherman ........................ 65/79
4,378,328 A * 3/1983 Przytulla et al. ............. 264/534
5,253,996 A * 10/1993 Moore .......................... 425/525
5,543,107 A * 8/1996 Malik et al. ................. 264/529

* cited by examiner

Primary Examiner—Suzanne E. McDowell
(74) Attorney, Agent, or Firm—Bacon & Thomas, PLLC

(57) ABSTRACT

A method for manufacturing a container. The method includes the steps of providing main body dies, passive dies, active dies and a supporting column, followed by providing a semi-solidified flexible material in a considerably solvent state in the form of a tubular blank that is positioned and squeezed on the supporting column. The dies are opened and closed so that the active dies will squeeze the blank against the supporting column. Air is blown into the blank to enable the blank to adhere onto a cavity-shaped wall that is surrounded by the main body dies, the passive dies and the active dies. Air blown into the blank is released and the active dies initiate a first movement upwardly in synchronization with the supporting column. The active dies link-up with the passive dies to conduct a second movement upwardly to enable the active dies to drive the blank to deform. The dies and the supporting column are withdrawn so that the blank formed by the steps above is removed so that the blank can be scraped to complete a finished-product.

3 Claims, 4 Drawing Sheets

CONTAINER MANUFACTURING METHOD

This application is a Continuation-in-part of nonprovisional application Ser. No. 08/992,271 filed Dec. 17, 1997 Abn.

BACKGROUND OF THE INVENTION

1. Field of the Invention

This invention relates to a container manufacturing method, where different operational starting points of active and passive molds are used, while part of the section undertakes a synchronous position-moving to form the structure of the rim at the opening of a vacuum container.

2. Description of the Related Art

Some ordinary containers are made of flexible materials from which volume production is undertaken by way of plastics processing. However, in the chamber formed by two halves of the molded body in traditional plastic processing, the upper and lower edges of the semi-solvent blank flows gradually downwards under a squeezing pressure from the two lateral sides of the two-halves of the molded body that are frequently employed to enable the sealed tubular blank to adhere firmly in an outward expansion manner onto the surrounding chamber by means of air blowing, so as to form a chamber-shaped vacuum ware, such as that of a conventional bottle container after air discharge and stripping processes have been completed.

However, some of the containers include rims at their opening for holding purposes, such as the flower pot structure indicated in FIG. 1, which includes a bottom 12 having a water leakage hole 11, the upper portion of flower pot 1 includes an opening 13, on the periphery of which a rim 14 is formed. The structure of the flower pot 1 generally carries a heavy load of earth, flowers and trees, and is subject to bending or deformity when the containers are moved. sometimes, the sharp rim 14 of the outer edge can cause injuries to users. Moreover, after years of being watered and heated by sunshine, the holding part of the rim 14 which is generally made of plastic material can easily break.

In U.S. Pat. No. 5,503,886 to Guarriello provides a flower container having a holding rim resembling a "hollow tube-like structure", in which two opening edges of a flower pot are integrally formed for the processing of cutting at the middle section, leaving a raised edge on the flange, which besides becoming deformed in its outer appearance, can also easily cause injury to the users. Moreover, the undertaking of another process to eliminate the raised edge will add additional steps and cost to the manufacturing process. The device of Guarriello includes a "hollow tube-like structure" having a lip, and the lip itself is jointly formed by the inner wall, lower wall, outer wall and upper wall. But no flange portion is found included in the lip, i.e. in Guarriello's patent; the "hollow tube-like structure" is connected with a flange which is annularly set. In this design, despite the fact that when a flow pot is raised, the user will hold the lip of the "hollow tube-like structure", the flange which is very thin in thickness will be used as the receiver to carry all the weight. If the flange breaks during transport, the flower container will fall down. That is why a vent has to be built to strengthen the flange. Although the upper wall of the "lip" is extending to the upper section of the flange to prevent the flange from breaking. And it would not be possible to easily strengthen the flange because the joining part of the container and the flange is very thin.

In the Netherlands Patent No. 296,835 to Koomen provides a flower container with a rim of "hollow tube-like structure", while in U.S. Pat. No. 4,378,328 to Przytulla has provided a manufacturing method using dies, by means of which a rim of "hollow tube-like structure" can be integrally formed on the flower pot container. But Koomen does not provide any method pertaining to the integral forming of a rim of a "hollow tube-like structure". Apparently it would be impossible to manufacture the flower pot container described in Koomen's patent if Przytulla's method is employed. If the flower container described in Koomen's patent is integrally formed by Przytulla's method, and in Koomen's patent a fused mark should at least be left behind at the joining section between the top surface and the cylindrical base. But judging from the circular arc plane indicated on the aforementioned joining section in Koomen's drawings, it is impossible that any mark or trace of fuse could be left on that specific spot. Moreover, in the "hollow tube-like section" of the rim, its interior hole resembles a complete circular section plane. Therefore, it would be impossible to achieve the object of integral forming if Przytulla's method is adopted.

In U.S. Pat. No. 4,378,328, Przytulla's attempt to integrally form a "hollow tube-like section" by means of different position-moving travel and the two slides of different advancing speed is deemed difficult to practice. Unless air blowing is continued in the tubular blank when the two slides are moving forward, thus it would be impossible that the material could be kept in contact with the vertical wall and the top surface of the two slides. Since air is to blow continuously in the tubular blank, the pressure produced by the air prevents the two slides from moving forward.

SUMMARY OF THE INVENTION

The objective of this invention is to provide an improved container manufacturing method which includes dies for the main body, passive dies, active dies, and dies for the supporting column, which enable the tubular blank which is under a solvent state to be supported, and also enables the dies to open and close and thus activate the active dies to fall down onto the blank on a surface of the supporting column to blow air into the tubular blank, and to enable the blank to expand and adhere onto the cavity-shape wall surface which is jointly surrounded and built by the main body dies, the passive dies and the active dies, and discharges the air to enable the active dies to conduct a first travel of position-moving synchronously with the supporting column, and then the active dies will conduct a second travel of position-moving in a linking-up manner with the passive dies to enable the blank which is being pushed forward by the active dies to draw near onto the blank which is adhered on the surface of the main body dies and, finally, to cause the passive dies, the active dies and the supporting column to withdraw, and then to take out the blank which is formed, and scrape off the remaining material and finish the container product.

BRIEF DESCRIPTION OF THE DRAWINGS

Other features and advantages of the present invention will become more apparent in the following detailed description of the preferred embodiments with reference to the accompanying drawings, in which.

DETAILED, DESCRIPTION OF THE PREFERRED EMBODIMENTS

Figure 1:
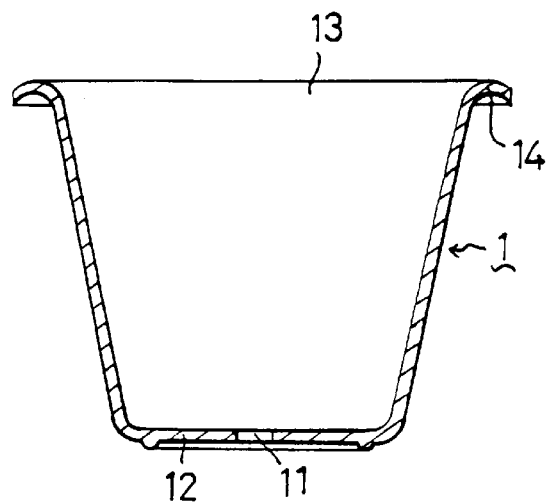
FIG. 1 is a sectional-view of the structure of a conventional flower container.

In the detailed description of the preferred embodiments, it should be noted that like elements are indicated by the same reference numerals throughout the disclosure.

Figure 2:
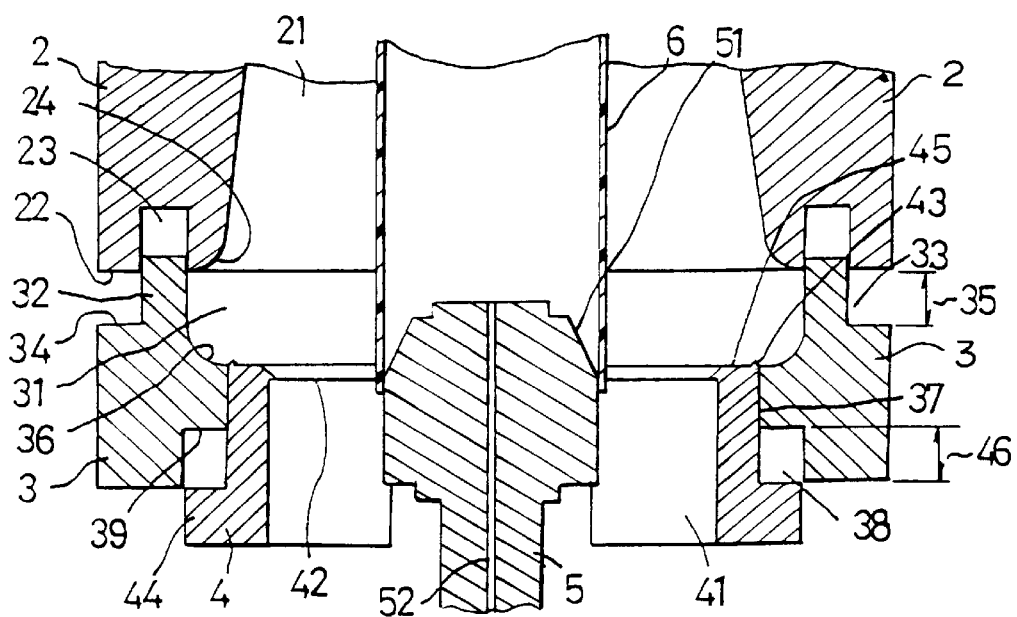
FIG. 2 shows a sectional view of the first forming process of preferred embodiments of the present invention.

Referring to FIG. 2, the structure of an ordinary flower container is used as the preferred embodiments of the present invention to describe its method of manufacture.

Two main body dies 2, are set corresponding to one another to form a cylindrical seat for a flower container. When opening and closing the two main body dies 2, each of the dies include a second sliding trough 23 concavity set at each end 22, where an arc-shaped exterior angle 24 is set at each end 22 proximate to the chamber 21.

Two passive dies 3 are set corresponding to each other and adapted to shape a part of the rim of a flower container. When opening and closing, the two passive dies 3 will jointly form a hollow cavity 31 in the interior, while the two passive dies 3 are set corresponding to the second sliding trough 23 of the two main body dies 2, each passive die 3 includes a sliding body 32 that can be wedged in between each of the second sliding troughs 23, and a shoulder 33 is formed in the exterior of each passive die 3, at the space between the bottom 34 of shoulder 33 and the ends 22 of main body dies 2, and a second travel distance 35 is maintained, while an arc-shape interior angle 36 is set in the second guiding body proximate to the interior edge of cavity 31. When the two passive dies 3 are closed, they form a pivot hole 37, while at the same time a first sliding trough 38 will be formed at its lower end, and a top plane 39 is also set at the first sliding trough 38.

Two active dies 4 are set corresponding to one another, and will form part of the rim of a flower container, and set within a pivot hole 37 of the passive dies 3. When opening and closing, the two active dies 4 will jointly form an accommodating space 41 in its interior, while each of the two active dies 4 has in its upper ends a stopper edge 42 set corresponding to one another, while at the upper ends a sharp wedged conical body 43 is set facing upward, and at the lateral side of each of its upper ends of the two active dies 4, a first guiding body 44 is provided for sliding in the first sliding trough 38 of the aforementioned passive dies 3 and, at the same time, a first travel distance 46 is maintained between the upper end plane 45 of first guiding body 44 and the top end surface of sliding trough 38 of the aforementioned passive dies 3.

A supporting column 5 which is set within the accommodating space 41 of the two active dies 4, has a conical guider 51 set at its upper part, at the interior of which air passage 52 is set through which the air can flow.

Procedure 1 enables the flexible material which is in a semi-solid solvent condition to form a tubular blank 6 for flowing downward, and when it reaches the supporting column 5 it will be guided by guider 51, and be sleeved into and squeezed against the supporting column 5, as shown in FIG. 2.

Figure 3:
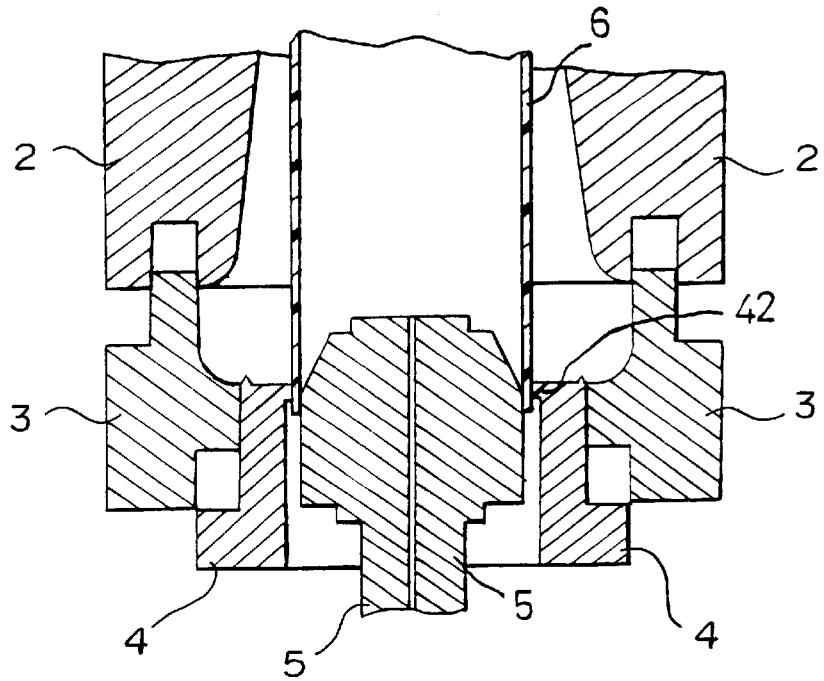
FIG. 3 shows a sectional view of the second forming process of preferred embodiments of the present invention.

For procedure 2, please refer to illustration provided in FIG. 3, which enables the dies to open and close by driving to cause the stopper edge 42 which is set to correspond to the upper end of the two active dies 4 and to grab onto the blank 6 at the outer periphery of the supporting column 5 to seal the space between the closed active dies 4 and the supporting column 5.

Figure 4:
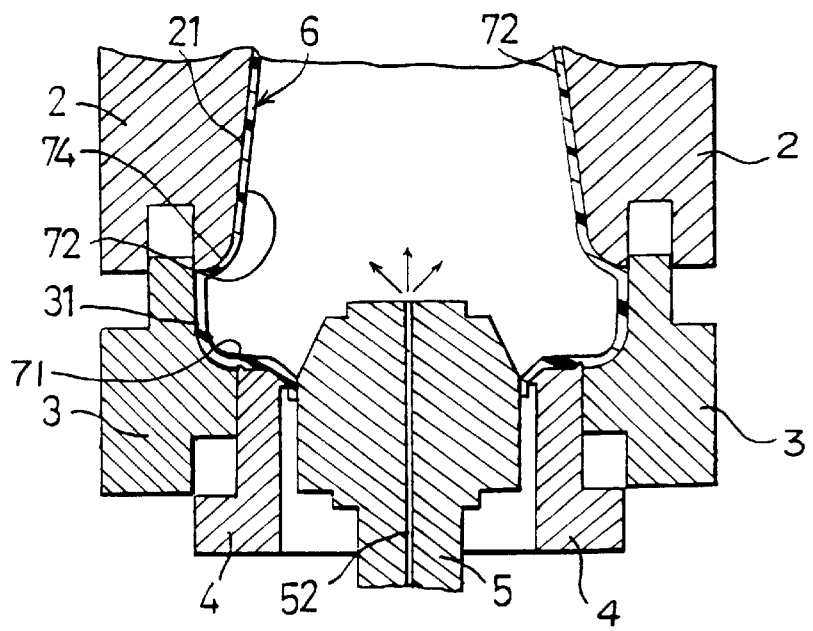
FIG. 4 shows a sectional view of the third forming process of preferred embodiments of the present invention.

For Procedure 3 please refer to the illustration provide in FIG. 4, where air is blown into the tubular blank 6 for the first time to enable high pressure air to be blown from the air passage 52 of the supporting column 5 into the tubular blank 6, enabling the blank to be expanded and adhered onto the inner cavity of the dies which includes the cavity chamber 21 of the main body dies 2, the cavity 31 of passive dies 3 and the upper portion of the supporting column 5. Such procedure enables the blank 6 to form a bottom part 71, a cylindrical seat 72, and a buckling and holding section 74 in a bending shape below the cylindrical seat 72.

Figure 5:
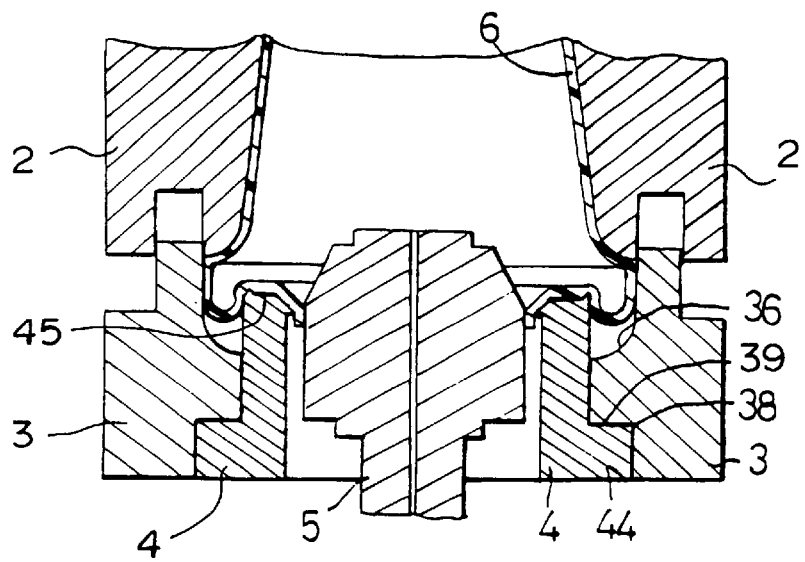
FIG. 5 shows a sectional view of the fourth forming process of preferred embodiments of the present invention.

For Procedure 4, please refer to the illustration provided in FIG. 5, where air is released for the first time, with the movement of the first travel distance 46 to be conducted by the two active dies 4 along the supporting column 5, i.e. after enabling the two active dies to be moved such that the upper end surface 45 of first guiding body 44 are squeezed against the top surface 39 of the first sliding trough 38 of the passive dies 3, and at this point the blank 6 at the upper end of the active dies 4 will be raised, and the blank 6 will separate from the arc-shape interior angle 36 of the passive dies 3.

Figure 6:
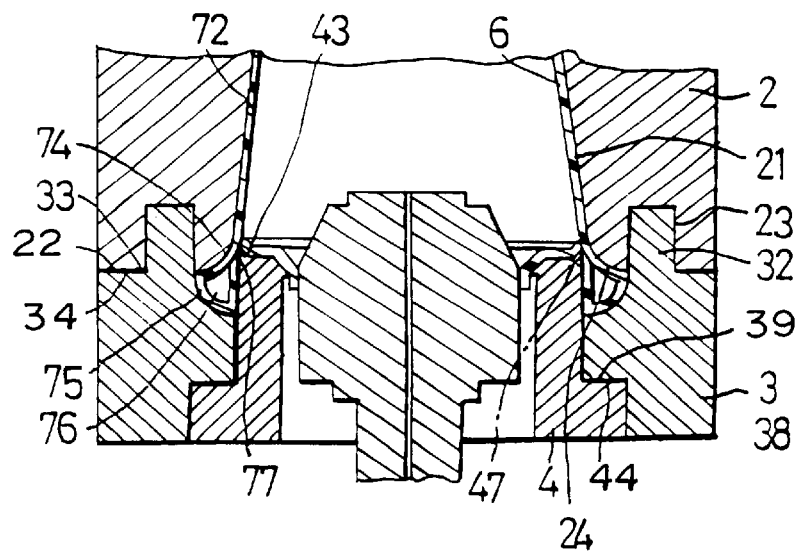
FIG. 6 shows a sectional view of the fifth forming process of preferred embodiments of the present invention.

For Procedure 5, please refer to the illustration provided in FIG. 6, in which after the movement of the two active dies 4 is made such that the first guiding body 44 contacts the top surface 39 in the first sliding trough 38 of the passive dies 3, and the movement of the passive dies 3 will then be activated in a linking-up process, so as to facilitate a moving forward motion in synchronization with the active dies 4, while the second guiding body 32 on the passive dies 3 is set corresponding to the sliding trough 23 which is slid into the main body dies 2 to enable the active dies 4 and the passive dies 3 to move along the second travel distance 35 between the bottom surface of shoulder 33 and end 22 of the main body dies 2, until the second travel distance 35 is minimized, while the blank 6 which is located at the upper end of the two passive dies 4 will just reach the interior edge proximate to the cavity chamber 21 at an arc-shaped exterior angle 24 of the end 22 of the main body dies 2. During the forming process of the flower container, the blank 6 will move upwards from the outer periphery of the buckling and holding section 74, and will further extend until it forms a top surface 75 in an arc-shape towards the center of cylindrical seat 72, and it will also form a sealed hollow tube-like section 76. During a solidified gluing state of the blank with its top surface 75 reversely buckled on the interior lateral side proximate to the buckling and holding section 74 of the cylindrical seat 72, there is a joining spot where the conical wedging body 43 at the upper end of the active dies 4 squeezes the blank 6 against buckling and holding section 74 and cylindrical seat 72, so as to form a directly continued extension state at the extreme end of the annular surface of the cylindrical seat. Therefore, the conical narrow groove 77 formed from the blank 6 by the aforementioned conical wedging body 43 will form an axis position at the aforesaid position which is in a solidified gluing state slightly proximate to the center of the flower container, and the aforementioned conical narrow groove 77 will deviate relatively closer to the central axis of the flower container at the aforesaid position which is in a solvent and solidified state.

Figure 7:
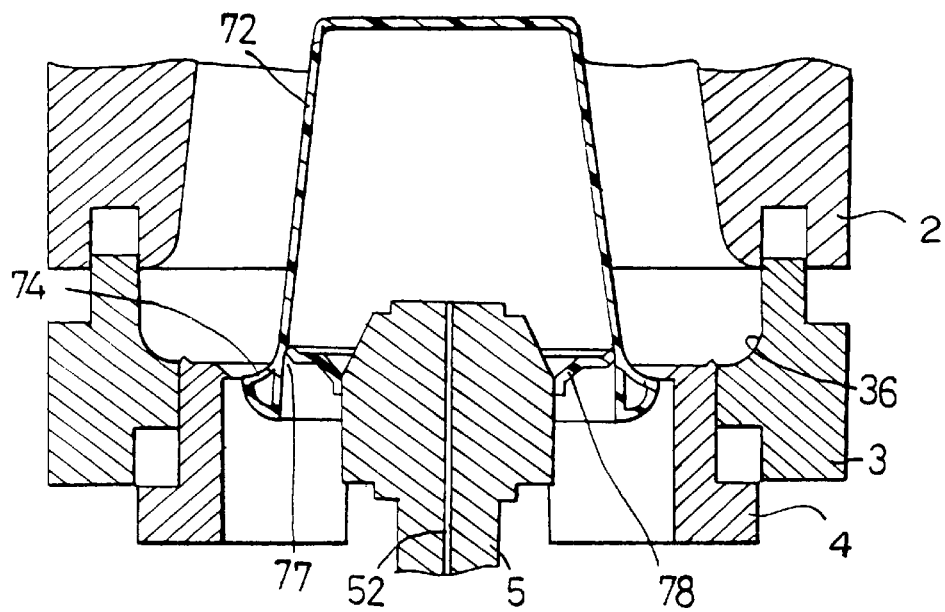
FIG. 7 shows a sectional view of the sixth forming process of preferred embodiments of the present invention.

For Procedure 6, please refer to the illustration provided in FIG. 7, in which after the main body dies 2, passive dies 3, and active dies 4 are opened, the entire flower container remaining with the blank 78 can be taken away. After scraping is done annularly by hand along narrow groove 77 with a blade by the workers, a finished-product of a flower container without wasting any part of the blank is completed. The conical narrow groove 77 deviates relatively closer to the central axis of the flower container than the joining part of buckling and holding section 74 and cylindrical seat 72. Therefore, the process of scraping would not cause any damage to cylindrical seat 72 or buckling and holding sectional 74.

Figure 8:
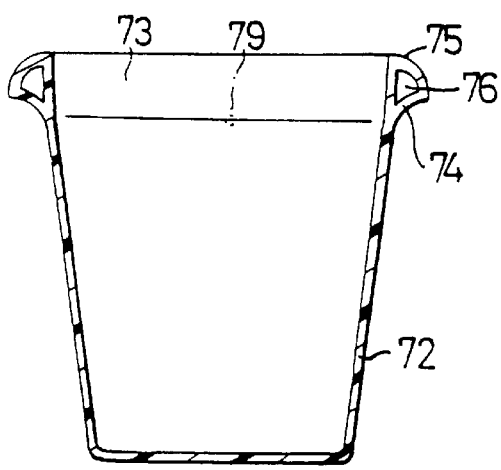
FIG. 8 shows a sectional view of the finished flower container of preferred embodiments of the present invention.

When moving the second travel distance 35, if the flower container which is formed is found to have a relatively large rim because of its large dimension, a second air blowing may be conducted through air passage 52 of supporting column 5 to increase the completeness of the aforesaid rim after forming. If the flower container is of a relatively smaller dimension, such an additional process is unnecessary because its run is relatively smaller; and by means of the lateral side in an arc-shape interior angle 36 of passive dies 3, a small concaved opening 47 as indicated by the imaginary line in FIG. 6 will be set to enable the blank therein to remain in a concaved condition which is desired to have as described in the aforementioned Procedure 3. In Procedure 5, despite a gluing and solidifying state of the blank in the upper end of active dies 4 in the interior edge proximate to cavity chamber 21 at the arc-shape exterior angle 24 of end 22 of main body dies 2, a small hole passage 79 for the passing of air is reserved in the finished-product as indicated in FIG. 8.

The present invention has the following advantages:

1. After the release of air, the active dies 4 will first move upward, and then they will reach and squeeze against the passive dies 3 to activate a synchronous position-moving, in which the active dies 4 can be utilized to squeeze against and spread the blank without adhering the blank against the active and passive dies by air all the time. Therefore, the advancing of the active and the passive dies can be conducted without being interfered by the force of resistance produced by the air. Although a second air blowing can be conducted for a large-dimensioned container, the timing for a second air blowing is fixed after the active dies 4 have completed the first travel distance. Therefore, an extremely short time is left for the second air blowing, and its objective is merely aimed at making up for the deficit of air in the hollow tubular area of the rim to prevent the hollow tubular moulding from sinking, without causing any force of resistance or interference to the advancing of the passive dies 3.

2. The movement of the active and the passive dies 4, 3 is actually conducted at different starting points at only one speed, and even at the time when the active dies 4 are in touch with the passive dies 3, the two then advance synchronously at the same speed. By comparison with the two dies adopted by the conventional art to control the movement at a different speed, it can be seen that the driving mechanism utilized by the present invention is less complex.

3. When utilizing the container formed by the present invention, and the buckling and holding section of the rim is being held by the hand of a worker, no injury can be caused by any rim having a sharp and pointed unfinished edge. When the remaining blank is being scraped annularly along the narrow groove with a blade, the aforementioned conical narrow groove deviates relatively closer to the central axis of the container than the joining part of the cylindrical seat and the buckling and holding section. Therefore, at the time of scraping, no damage will be caused to the cylindrical seat or buckling and holding section.

4. In the outer periphery of the aforementioned buckling and holding section that points upward and is bent towards the center of the cylindrical seat and the section which is adhered reversely in a solidified state on the cylindrical seat proximate to the lateral surface of the buckling and holding section, each section of which will form a supporting rib in between the top surface of the rim and the surface of the buckling and holding section to provide considerably high strength to the entire rim, and is capable of fully receiving the heavy load of earth, flower or tree carried in the container in a safe manner without causing any damages, and a considerable supporting strength will still be provided by the buckling and holding section at the lower direction of the rim.

The present invention has been described in connection with what is considered the most practical and preferred embodiments, and it is understood that this invention is not limited to the disclosed embodiments but is intended to cover various arrangements included within the spirit and scope of the broadest interpretations and equivalent arrangements.

What is claimed is:

1. A method for manufacturing a container, which includes the steps of:

providing main body dies, passive dies, active dies and a supporting column;

providing a semi-solidified flexible material in a considerably solvent state in the form of a tubular blank that is positioned and squeezed on the supporting column;

opening and closing of the main body dies and the passive dies so that the active dies will squeeze the blank against the supporting column;

blowing air into the blank to enable the blank to adhere onto a cavity-shaped wall that is surrounded by the main body dies, the passive dies and the active dies;

releasing the air blown into the blank and activating the active dies to initiate a first movement upwardly in synchronization with the supporting column;

engaging the active dies in a linking-up process with the passive dies to conduct a second movement upwardly so that the active dies, supporting column and the passive dies deform the blank; and withdrawing the passive dies, the active dies, and the supporting column, so that the blank formed by the steps above is removed and scraped to complete a finished-product of the container.

2. The method for manufacturing a container, as claimed in claim 1, wherein the step of engaging the active dies further includes a process in which a second air blowing is conducted.

3. The manufacturing method for a container as claimed in claim 1, wherein in the step of engaging the active dies, said blank which is driven by the active dies transforms from the solvent state to a solid state after the blank is adhered on the main body dies.

* * * * *